United States Patent
Zhang et al.

(10) Patent No.: US 10,243,393 B2
(45) Date of Patent: Mar. 26, 2019

(54) CHARGING SYSTEM BASED ON WIRELESS COMMUNICATION

(71) Applicant: NEW FOCUS LIGHTING & POWER TECHNOLOGY (SHANGHAI) CO., LTD., Shanghai (CN)

(72) Inventors: Jianxing Zhang, Shanghai (CN); Shiquan Gong, Shanghai (CN)

(73) Assignee: NEW FOCUS LIGHTING & POWER TECHNOLOGY (SHANGHAI) CO., LTD., Shanghai (CN)

( * ) Notice: Subject to any disclaimer, the term of this patent is extended or adjusted under 35 U.S.C. 154(b) by 261 days.

(21) Appl. No.: 15/308,539

(22) PCT Filed: Nov. 11, 2015

(86) PCT No.: PCT/CN2015/094252
§ 371 (c)(1),
(2) Date: Nov. 2, 2016

(87) PCT Pub. No.: WO2017/035952
PCT Pub. Date: Mar. 9, 2017

(65) Prior Publication Data
US 2017/0271907 A1  Sep. 21, 2017

(30) Foreign Application Priority Data
Sep. 2, 2015 (CN) .......................... 2015 1 0557259

(51) Int. Cl.
*H02J 7/00* (2006.01)
*H02J 7/02* (2016.01)
(Continued)

(52) U.S. Cl.
CPC ............ *H02J 7/025* (2013.01); *H02J 7/0004* (2013.01); *H02J 7/027* (2013.01); *H02J 50/80* (2016.02);
(Continued)

(58) Field of Classification Search
USPC ......................................... 320/108
See application file for complete search history.

(56) References Cited

U.S. PATENT DOCUMENTS

2013/0234649 A1* 9/2013 Sevier ..................... H02J 7/007
  320/107
2015/0084583 A1* 3/2015 Jung ...................... H02J 7/0042
  320/108

* cited by examiner

*Primary Examiner* — Robert J Grant
(74) *Attorney, Agent, or Firm* — Levenfeld Pearlstein, LLC

(57) ABSTRACT

The present invention relates to a charging system based on wireless communication comprising: a mobile terminal, configured to transmit a control instruction and receive the query data matching user's selection according to the user's selection; a charging system, configured to receive the control instruction and charge a rechargeable battery pack according to the control instruction; a wireless communication, configured to interact with data between the mobile terminal and the charging system; wherein, the mobile terminal comprises: a query unit, configured to receive the query data inputted by the user and read the query data stored in a memory unit and matching the query according to the query data. User may get a charging curve and/or a remaining charging time according to the acquisition data. After charging completes, the mobile terminal will send a control instruction to stop charging so as to save energy and protect the battery.

10 Claims, 1 Drawing Sheet

(51) Int. Cl.
*H02J 50/80* (2016.01)
*H04B 5/00* (2006.01)

(52) U.S. Cl.
CPC .... *H04B 5/0037* (2013.01); *H02J 2007/0096* (2013.01)

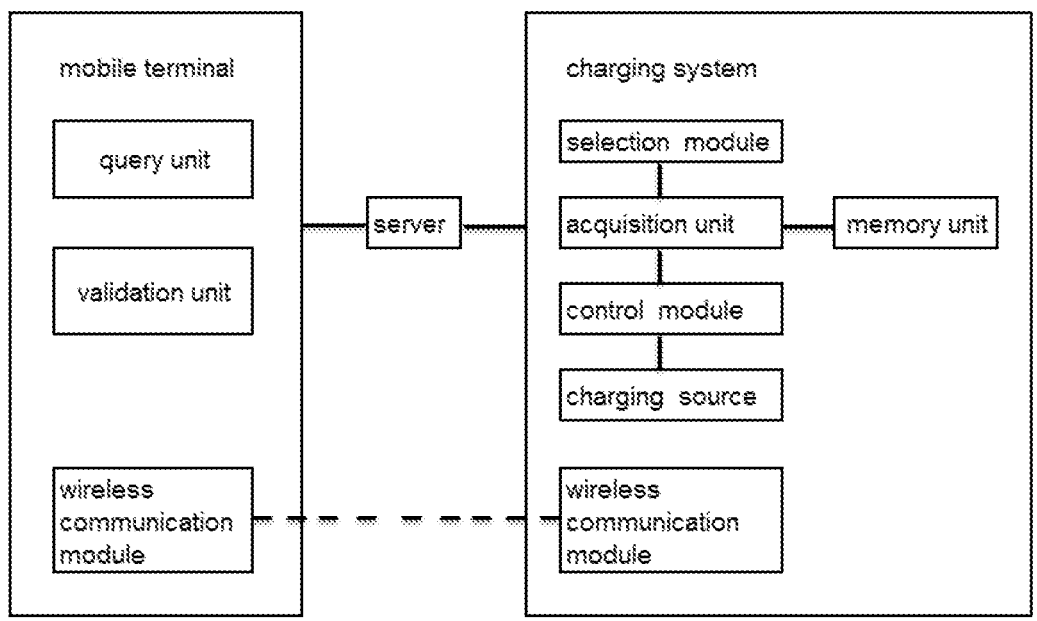

CHARGING SYSTEM BASED ON WIRELESS COMMUNICATION

CROSS-REFERENCE TO RELATED APPLICATIONS

The present application claims priority to and the benefit of Chinese Patent Application No. CN 201510557259.0, filed on Sep. 2, 2015, the entire content of which is incorporated herein by reference.

BACKGROUND OF THE INVENTION

1. Field of the Invention

The present invention relates to the field of wireless charging, more particularly, to a charging system based on wireless communication.

2. Description of the Related Art

With the development of science and technology, battery has been used widely in our daily life, thus the charging device plays an indispensable role in our life. For the present smart charging device, the charging mode can be chosen according to the types of the rechargeable battery pack; however, the present smart charging device can only control the charging current and voltage according to the current and voltage of the rechargeable battery pack acquired currently, the charger may not be able to acquire the historical charging data, and may not able to monitor the state of the battery, let alone monitor the health status of battery. For instance, when charging a car, the present smart charging device acquire the state data of the rechargeable battery pack of the car, then charge the battery according to the fetched state data, nevertheless, this charging method has many drawbacks: the smart charging device is unable to acquire the previous state data of the rechargeable battery, which, however, is unable to judge whether the battery is in a healthy state. In this case, the smart charging device usually defaults to the battery being in a healthy state, and then adopts normal mode to charge the battery, and the charging method do great harm to the battery. Furthermore, the present smart charging device is also unable to acquire the remaining charging time; there is a common situation, the battery pack has been fully charged, but the charging device still charge to the battery pack, and the consequence is that the unnecessary electric energy converts to heat for consuming; meanwhile, the temperature of the battery rises which does great harm to the battery within the battery pack and seriously wastes electric energy.

SUMMARY OF THE INVENTION

Aimed at the above-mentioned problems existing in the prior art, this invention provides a charging system based on wireless communication to monitor the charging state of the battery in real time.

The technical objective of the invention is realized by the following technical means: a charging system based on wireless communication, comprising:

a mobile terminal, configured to transmit a control instruction and receive query data matching user's selection according to the user's selection, a charging system, configured to receive the control instruction and charge a rechargeable battery pack according to the control instruction, a wireless communication module, configured to interact with data between the mobile terminal and the charging system, wherein, the mobile terminal comprises: a query unit, configured to receive the query data inputted by the user and read the query data stored in a memory unit and matching the query according to the query data.

Preferably, the charging system based on wireless communication, wherein, the charging system comprises:

a selection module, configured to choose a charging method matching the type of the battery pack under effect of the control instruction;

a data acquisition unit, configured to collect the data of current state of the rechargeable battery pack and form an output of the acquisition data.

a control unit, configured to receive the acquisition data and form a charging control instruction according to the acquisition data.

a charging source, configured to send electric energy signal to the rechargeable battery pack under the effect of the charging control instruction.

Preferably, the charging system based on wireless communication, wherein, the control unit consisting of MCU chips.

Preferably, the charging system based on wireless communication, wherein, types of the rechargeable battery pack comprises lead-acid battery and lithium battery.

Preferably, the charging system based on wireless communication, wherein, the acquisition data comprises voltage acquisition data, and/or current acquisition data, and/or temperature acquisition data.

Preferably, the charging system based on wireless communication, wherein, the charging system comprises: the memory unit, configured to record and store the charging data of the rechargeable battery pack while the rechargeable battery pack being charged.

Preferably, the charging system based on wireless communication, wherein, the mobile terminal comprises: a compute unit, configured to compute and form a charging curve and/or a remaining charging time according to the acquisition data.

Preferably, the charging system based on wireless communication, wherein, the mobile terminal comprises: a display unit, configured to display the query data.

Preferably, the charging system based on wireless communication, wherein, the wireless communication module is a WIFI module, and/or a Bluetooth module.

Preferably, the charging system based on wireless communication, wherein, the mobile terminal comprises a validation unit, configured to identify user.

Compare with the present art, the invention has the advantages that: after the rechargeable battery pack connects to the charging system, with the transmitting of a control instruction from the mobile terminal to the charging system, the charging system charges the rechargeable battery pack according to the control instruction of the mobile terminal; further more, user can send a query instruction to the charging system through the mobile terminal, and acquire the query data matching the query instruction through a wireless communication module. The wireless communication module is configured to interact with data between the mobile terminal and the charging system. Wherein, the mobile terminal comprises a query unit to receive the query instruction inputted by user, and read the query data stored in a memory unit and matching the query according to the query instruction. User can get a charging curve and/or a remaining charging time of the rechargeable battery pack through the query unit. After charging was complete, the mobile terminal sends a control instruction to stop charging so as to save energy and protect the battery.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 1 is a structure diagram of a charging system based on wireless communication.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

As shown in FIG. 1, a charging system based on wireless communication, comprising:

a mobile terminal, configured to transmit a control instruction and receive query data matching user's selection according to the user's selection, a charging system, configured to receive the control instruction and charge a rechargeable battery pack according to the control instruction, a wireless communication module, configured to interact with data between the mobile terminal and the charging system, wherein, the mobile terminal comprises: a query unit, configured to receive the query data inputted by the user and read the query data stored in a memory unit and matching the query according to the query data.

The principle of the invention is that: after the rechargeable battery pack connects to the charging system, the user uses the mobile terminal to transmit a control instruction to the charging system; the charging system charges the rechargeable battery pack according to the control instruction transmitted from the mobile terminal; furthermore, the user can also send a query instruction to the charging system through the mobile terminal, and acquires the query data matching the query instruction through a wireless communication module. The wireless communication module is configured to interact with data between the mobile terminal and the charging system. Wherein, the above mentioned mobile terminal comprises a query unit to receive the query instruction inputted by user, and read the query data stored in a memory unit and matching the query instruction according to the query instruction. User can get a charging curve and/or a remaining charging time of the rechargeable battery pack through the query unit. After charging was complete, the mobile terminal sends a control instruction to stop charging so as to save energy and protect the battery.

An embodiment of the invention is provided as follows.

A user sends a control instruction of "start-charging" to the chargeable system through the mobile terminal; the wireless communication module transmits the control instruction of "start-charging"; once the charging system receives the control instruction of "start-charging" sent by the wireless communication module, the charging system will start, and at the same time, the mobile terminal will read the historical charging data matching the rechargeable battery pack; and according to the historical charging data and the acquisition data acquired by the charging system in real-time, the most suitable charging method will be chose. Further more, user can also get a charging curve and/or a remaining charging time of the rechargeable battery pack through the query unit in the mobile terminal. With the charging curve, it can be checked whether the rechargeable battery pack is in a healthy state, and the remaining charging time can be queried, and after charging completes, the mobile terminal will send a control instruction to stop charging so as to save energy and protect the battery.

As a further preferred embodiment, the charging system based on wireless communication, wherein, comprises:

a selection module, configured to choose the charging method matching the type of the battery pack under the effect of the control instruction; further, the type of the rechargeable battery pack comprises lead-acid battery and lithium battery. The selection module chooses the type of the rechargeable battery pack according to the control instruction so as to avoid the current or the voltage mismatching the rechargeable battery pack;

a data acquisition unit, configured to acquire the data of current state of the rechargeable battery pack and form an output of the acquisition data; further, the acquisition data comprises the voltage acquisition data, and/or the current acquisition data, and/or the temperature acquisition data;

a control unit, configured to receive the acquisition data and form a charging control instruction according to the acquisition data; the above mentioned control unit consists of MCU chips; a charging source, configured to send electric energy signal to the rechargeable battery pack under the effect of the charging control instruction; and may further comprise a compute unit, configured to compute and form a charging curve and/or a remaining charging time according to the acquisition data acquired by the acquisition unit.

For instance, if a battery within the battery pack breaks down, according to the tandem diverting theory, the breakdown battery will not be able to divert; thus according to the historical charging data and real-time acquisition data, the control unit reduces the charging current so that each battery is in a suitable charging state.

As a further preferred embodiment, the charging system based on wireless communication, wherein, comprises: a memory unit, configured to record and store the charging data of the rechargeable battery pack while the rechargeable battery pack being charged. The charging data recorded by the memory unit can be used as a historical charging data for a next charging.

As a further preferred embodiment, as the charging system based on wireless communication, wherein, the mobile terminal further comprises: a display unit, is configured to display the query data.

As a further preferred embodiment, as the charging system based on wireless communication, wherein, the wireless communication module is a WIFI module, and/or a Bluetooth module.

As a further preferred embodiment, as the charging system based on wireless communication, wherein, the mobile terminal comprises a validation unit, configured to identify user.

In a further embodiment of the invention, the operating mode of the charging system comprises near-field control charging mode and far-field control charging mode.

In the near-field control charging mode, the wireless communication module may be a short-range communication module, and the mobile terminal identifies user through the validation unit; if the identification is successful, the data is transmitted to the charging system through the wireless communication module; the user choose the type of the rechargeable battery pack first, and the selection module choose the charging method according to the type of the rechargeable battery pack, then the mobile terminal reads the historical charging data of the rechargeable battery, and with the combination of the acquisition data outputted the data acquisition unit a control instrument is generated; the charging system charges the rechargeable battery pack under the effect of the control instrument; the user queries the charging curve and the remaining charging time through the query unit.

In far-field control charging mode, the wireless communication module may be a long-distance communication module; the first time the mobile terminal connected, the user pushes code through the adapter module; once the code is pushed successfully, the mobile terminal will connect to the charging system, and the subsequent charging process is similar to the near-field control charging mode and is not to be detailed herein.

The foregoing is only the preferred embodiments of the invention, not thus limiting embodiments and scope of the invention, those skilled in the art should be able to realize that the schemes obtained from the content of specification and figures of the invention are within the scope of the invention.

What is claimed is:

1. A charging system based on wireless communication, comprising:
   a mobile terminal, configured to transmit a control instruction and receive query data matching user's selection according to the user's selection;
   a charging system, configured to receive the control instruction and charge a rechargeable battery pack according to the control instruction; and
   a wireless communication module configured to interact with data between the mobile terminal and the charging system,
   wherein, the mobile terminal comprises a query unit configured to receive the query data inputted by the user and read the query data stored in a memory unit and matching a query according to the query data, and
   wherein when a user sends a control instruction of start-charging to the chargeable system through the mobile terminal, the wireless communication module transmits the control instruction of start-charging and, once the charging system receives the control instruction of start-charging sent by the wireless communication module, the charging system starts and at the same time, the mobile terminal reads historical charging data matching the rechargeable battery pack and according to the historical charging data and acquisition data acquired by the charging system in real-time, a most suitable charging method is chosen, a user is able to obtain a charging curve and/or a remaining charging time of the rechargeable battery pack through the query unit in the mobile terminal and, with the charging curve, the user is able to check whether the rechargeable battery pack is in a healthy state, and the remaining charging time can be queried, and after charging completes, the mobile terminal sends a control instruction to stop charging to save energy and protect the battery.

2. The charging system based on wireless communication claimed in claim 1, wherein the charging system comprises:
   a selection module configured to choose a charging method matching the type of the battery pack under effect of the control instruction;
   a data acquisition unit configured to acquire data of a current state of the rechargeable battery pack and form an output of the acquisition data;
   a control unit configured to receive the acquisition data and form a charging control instruction according to the acquisition data; and
   a charging source configured to send an electric energy signal to the rechargeable battery pack under the effect of the charging control instruction.

3. The charging system based on wireless communication claimed in claim 2, wherein the control unit consists of MCU chips.

4. The charging system based on wireless communication claimed in claim 2, wherein types of the rechargeable battery pack comprises lead-acid battery and lithium battery.

5. The charging system based on wireless communication claimed in claim 2, wherein the acquisition data comprises voltage acquisition data, and/or current acquisition data, and/or temperature acquisition data.

6. The charging system based on wireless communication claimed in claim 2, wherein the memory unit is configured to record and store charging data of the rechargeable battery pack while the rechargeable battery pack is being charged.

7. The charging system based on wireless communication claimed in claim 2, wherein the mobile terminal comprises a compute unit configured to compute and form the charging curve and/or the remaining charging time according to the acquisition data.

8. The charging system based on wireless communication claimed in claim 7, wherein the mobile terminal comprises a display unit configured to display the query data.

9. The charging system based on wireless communication claimed in claim 1, wherein the wireless communication module is a WIFI module, and/or a Bluetooth module.

10. The charging system based on wireless communication claimed in claim 1, wherein the mobile terminal comprises a validation unit configured to identify user.

* * * * *